(12) United States Patent
Mandelbaum et al.

(10) Patent No.: US 8,059,332 B2
(45) Date of Patent: Nov. 15, 2011

(54) RADIATION-PROTECTION DEVICE

(75) Inventors: Idan Mandelbaum, Columbia, MD (US); Arie Zigler, Houston, TX (US); Konstantinos Papadopoulos, Chevy Chase, MD (US); Louise C. Sengupta, Ellicott City, MD (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 12/627,250

(22) Filed: Nov. 30, 2009

(65) Prior Publication Data
US 2011/0128605 A1 Jun. 2, 2011

(51) Int. Cl.
*G02F 1/00* (2006.01)
*G02F 1/137* (2006.01)
*G02B 5/22* (2006.01)

(52) U.S. Cl. ........ 359/321; 359/241; 359/885; 977/701; 977/773; 977/932

(58) Field of Classification Search .................. 359/241, 359/288, 299, 321, 885, 886; 385/131; 977/701, 977/773, 932
See application file for complete search history.

(56) References Cited

U.S. PATENT DOCUMENTS

| | | | |
|---|---|---|---|
| 5,017,769 A * | 5/1991 | Cohn et al. | 250/216 |
| 5,149,957 A * | 9/1992 | Pierce et al. | 250/214.1 |
| 7,177,516 B1 * | 2/2007 | Ahn | 385/131 |
| 7,223,959 B2 * | 5/2007 | Fuller | 250/216 |
| 7,405,864 B2 * | 7/2008 | Uchida | 359/296 |
| 2011/0075263 A1 * | 3/2011 | Liberman et al. | 359/614 |

* cited by examiner

*Primary Examiner* — David N Spector
(74) *Attorney, Agent, or Firm* — Rossi, Kimms & McDowell LLP

(57) ABSTRACT

A radiation-protection device is provided that includes a substrate and a surface structure formed on the substrate. The surface structure has an arrangement and interacts with radiation and the substrate to at least (a) substantially transmit or attenuate radiation at a wavelength and an energy below a threshold energy, and (b) substantially reflect radiation at the wavelength and an energy above the threshold energy.

17 Claims, 9 Drawing Sheets

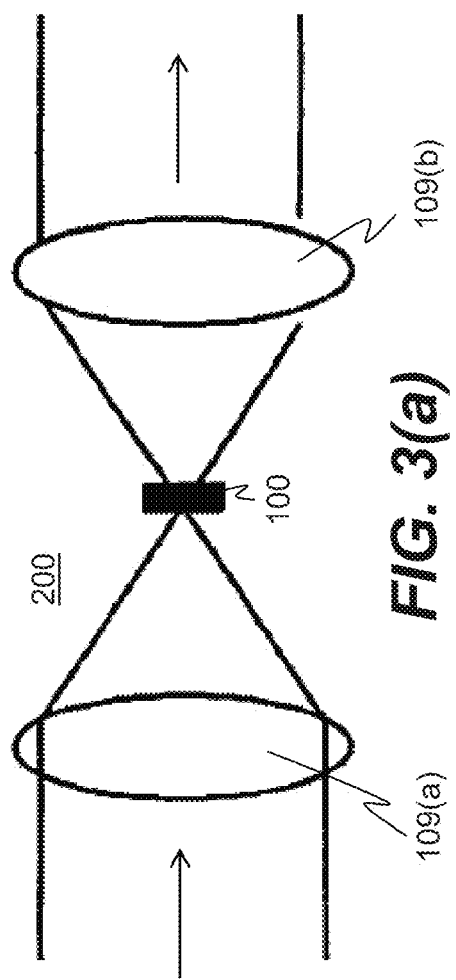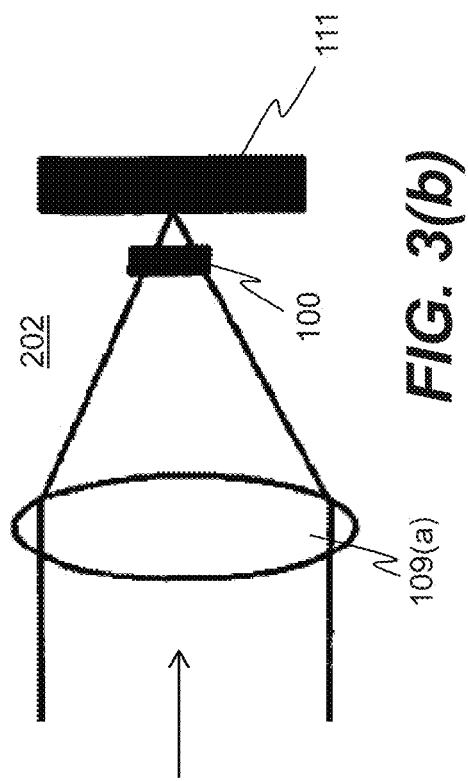

RADIATION-PROTECTION DEVICE

FIELD OF THE INVENTION

This invention relates to radiation-protection.

BACKGROUND

Delicate optical devices, such as image sensors, can be damaged by high intensity light. In this regard, directed energy weapons in the optical range are becoming more widely available, more powerful, and more compact. Accordingly, such weapons pose an increasing threat for optically dependent instruments.

Conventional techniques for protecting an optically dependent instrument involved use of shutters. Upon detection of overly intense radiation, the shutter would be closed to protect the optically dependent instrument. However, because of a delay between detection of the overly intense radiation and the closing of the shutter, some of the overly intense radiation would impact the optically dependent instrument and could cause damage.

Accordingly, a need in the art exists for improved solutions to protecting delicate optical devices from overly intense light.

SUMMARY

The above-described problem is addressed and technical solutions are achieved in the art by systems and methods associated with radiation protection devices, according to various embodiments of the present invention.

According to some embodiments of the present invention, a radiation-protection device includes a substrate and a surface structure formed on the substrate. The surface structure has an arrangement that interacts with radiation and the substrate to at least (a) substantially transmit or attenuate radiation at a wavelength and an energy below a threshold energy, and (b) substantially reflect radiation at the wavelength and an energy above the threshold energy. The radiation can be visible light or infra-red radiation, and the surface structure can be a surface plasmon structure. The surface structure can be formed of a metal and the substrate can be formed of a semiconductor. In some embodiments, a band gap of the substrate is several times higher than an optical energy of a photon at the wavelength.

The surface structure can include metallic pillars. Some of the metallic pillars can have larger cross-sectional areas than others of the metallic pillars. Pillars having a larger cross-sectional area can be capacitively coupled to at least some of the pillars having a relatively small cross-sectional area.

The metallic pillars can be formed in a periodic arrangement, and the radiation-protection device can act as a band-stop filter when radiation is incident upon the radiation-protection device having energy lower than the threshold energy. Or, the metallic pillars can be formed in an aperiodic arrangement. In this case, the radiation-protection device can act as a broader-band-stop filter than if the metallic pillars were formed in a periodic arrangement when radiation is incident upon the radiation-protection device having energy lower than the threshold energy.

In some embodiments, the pillars are formed at or substantially at right-angles to each other.

In some embodiments, the surface structure includes a metallic surface with holes therein. In this case, some of the holes can be larger than others of the holes. The holes can be formed in a periodic arrangement. In this case, the radiation-protection device can act as a band-stop filter when radiation is incident upon the radiation-protection device having energy lower than the threshold energy. Or, the holes can be formed in an aperiodic arrangement. In this case, the radiation-protection device can act as a broader-band-stop filter than if the holes were formed in a periodic arrangement when radiation is incident upon the radiation-protection device having energy lower than the threshold energy.

According to some embodiments of the present invention, an optical system includes an optical element and a radiation-protection device. The radiation-protection device can be located in a position that receives incoming radiation before the incoming radiation is received by the optical element. The radiation-protection device can include a substrate and a surface structure formed on the substrate. The surface structure can have an arrangement and can interact with radiation and the substrate to at least (a) substantially transmit or attenuate radiation at a wavelength and an energy below a threshold energy, and (b) substantially reflect radiation at the wavelength and an energy above the threshold energy. In some embodiments, the radiation-protection device is located at or substantially at a focal point of the optical element. The optical element can be a lens or an optical detecting device, for example.

According to some embodiments of the present invention, a method includes forming a surface structure on a substrate, the surface structure having an arrangement and interacting with radiation and the substrate to at least (a) substantially transmit or attenuate radiation at a wavelength Lf and an energy below a threshold energy T, and (b) substantially reflect radiation at the wavelength Lf and an energy above the threshold energy T. The arrangement of the surface structure can be chosen to cause a local field enhancement LFE that provides a predetermined threshold energy according to the following relationship: T=EIs(Lf)/LFE, where EIs is an ionization energy of the substrate.

According to some embodiments of the present invention, a method implemented at least in part by a data processing system includes receiving an indication of a threshold energy at or about at which a device is to change from transmitting or attenuating radiation to reflecting radiation. The method also includes receiving an indication of a wavelength of radiation to be transmitted or attenuated when interacting with the device at an energy below the threshold energy. In addition, the method includes receiving an indication of a material to be used for a substrate for the device and an indication of a material to be used for a surface structure for the device to be formed on the substrate. Further, the method includes determining an arrangement of the surface structure that will transmit or attenuate the wavelength of radiation when interacting with the device at an energy below the threshold energy, and will reflect the wavelength of radiation at an energy above the threshold energy. The method also includes storing the determined arrangement of the surface structure in a processor-accessible-memory-device system.

In addition to the embodiments described above, further embodiments will become apparent by reference to the drawings and by study of the following detailed description.

BRIEF DESCRIPTION OF THE DRAWINGS

The present invention will be more readily understood from the detailed description of preferred embodiments presented below considered in conjunction with the attached drawings, of which:

FIGS. 3(a) and 3(b) illustrate optical systems, according to some embodiments of the present invention;

It is to be understood that the attached drawings are for purposes of illustrating the concepts of the invention and may not be to scale.

DETAILED DESCRIPTION

Embodiments of the present invention pertain to the configuring of a radiation-protection device so that the device transmits desired radiation frequencies at low energy, but reflects such frequencies at high energy. In addition, the energy at which the radiation protection device changes from a transmission mode to a reflection mode also can be configured to meet a particular need. The speed at which the radiation protection device switches from the transmission mode to the reflection mode is much quicker (on the order of femtoseconds) than conventional shutter-techniques. Accordingly, a wide variety of radiation-protection devices can be designed to meet a wide variety of different applications.

The invention is inclusive of combinations of the embodiments described herein. References to a particular embodiment refer to features that are present in at least one embodiment of the invention. Separate references to an embodiment or particular embodiments do not necessarily refer to the same embodiment or embodiments. The embodiments herein are not mutually exclusive, unless so indicated or as are readily apparent to one of skill in the art. The use of singular or plural in referring to an embodiment or embodiments is not limiting. Further, it should be noted that, unless otherwise explicitly noted or required by context, the word "or" is used in this disclosure in a non-exclusive sense.

Figure 1B:
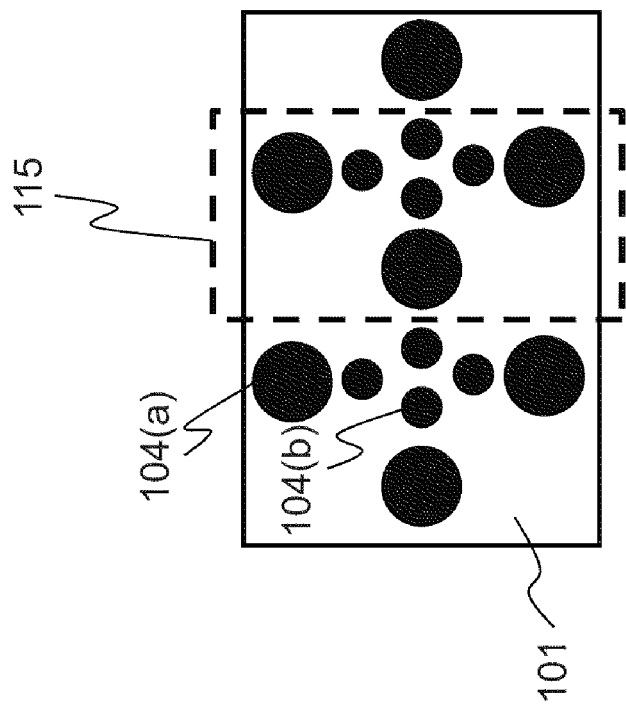
FIGS. 1(a) and 1(b) illustrate a radiation-protection device, according to an embodiment of the present invention.
Figure 1A:
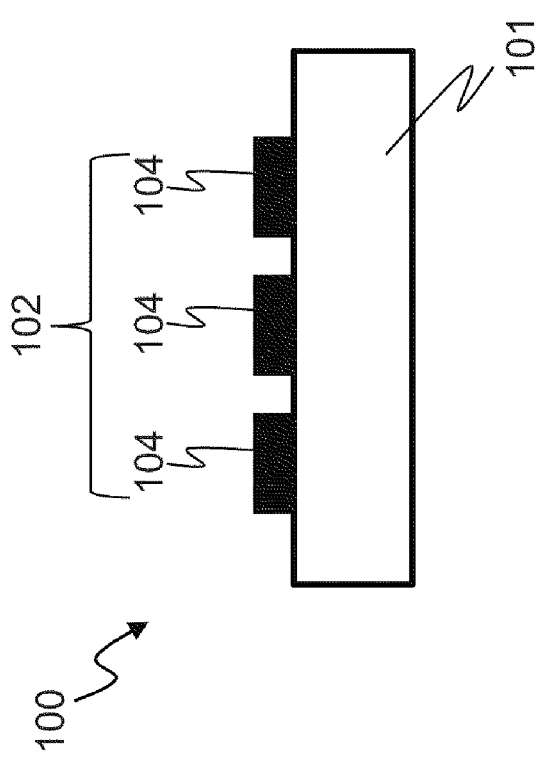

FIGS. 1(a) and 1(b) illustrate a radiation-protection device 100, according to an embodiment of the present invention. The device 100 includes a substrate 101, which can be formed of a semiconductor material, and a metallic surface structure 102, which can include an arrangement of metallic pillars 104. The metallic pillars 104 can be formed on the substrate 101 using conventional photolithography techniques in the near and far infra-red wavelengths or by using more recent nanolithography techniques in the visible wavelengths.

Figure 2:
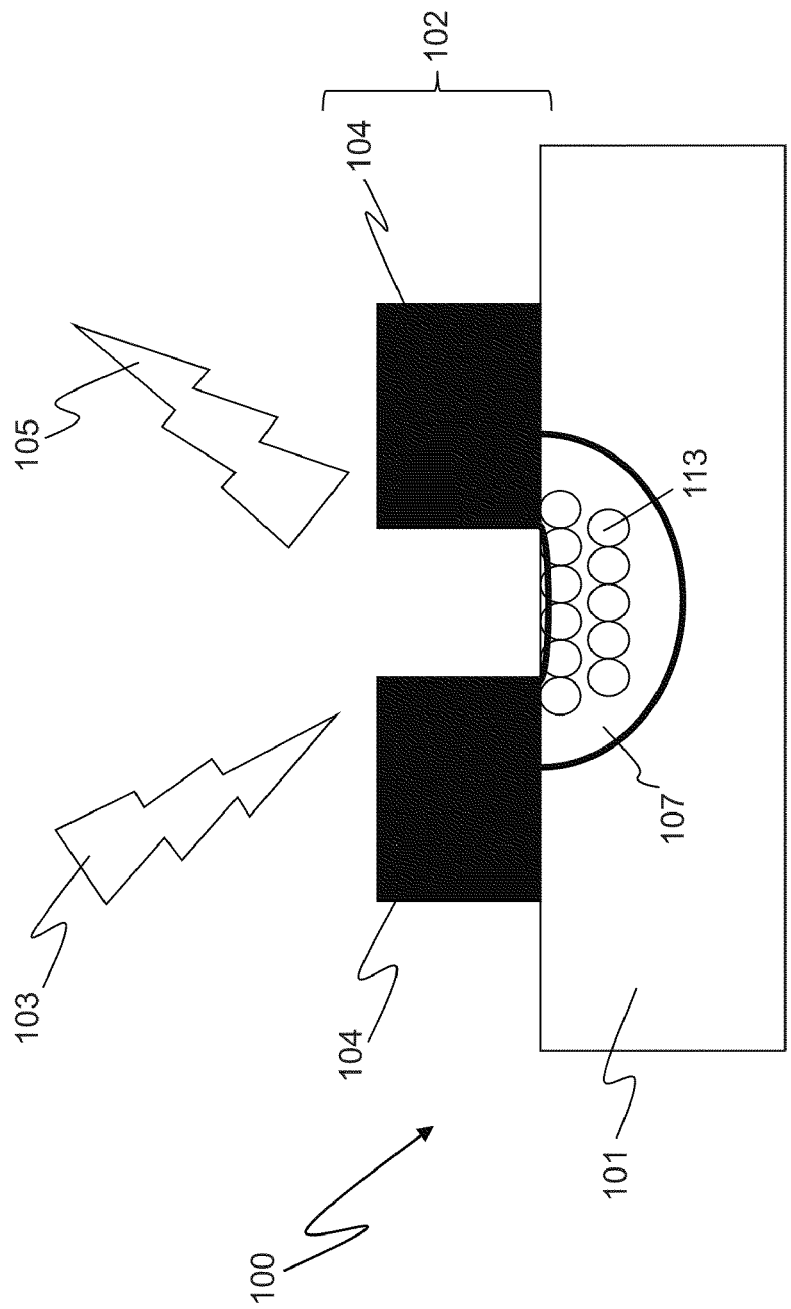
FIG. 2 illustrates an operation of a radiation protection device, according to an embodiment of the present invention.

With reference to FIG. 2, when incoming high intensity radiation 103 interacts with the surface structure 102, strong localized electric fields are generated by such structure 102. The strong local electric fields cause ionization in the substrate 101, thereby freeing electrons 113 in the substrate 101. The free electrons 113 are shown in a channel 107 between metallic pillars 104 in FIG. 2. Although current does not flow from the free electrons 113, the free electrons 113 impact and, consequently, free other electrons. This process of freeing electrons 113 accelerates causing an 'electronic avalanche'. The resulting large charge density of the free electrons 113 forms plasma. Due to this formation of plasma, the surface structure 102 is sometimes referred to herein as a "surface plasmon structure." When a frequency of the plasma reaches the frequency of the incoming radiation 103, the plasma becomes metallic and reflects the incoming radiation 103, as represented in FIG. 2 by reflected radiation 105.

To elaborate, at sufficient intensity of the incoming radiation 103, the refractive index of the device 100 becomes the square root of $\in_{plasma}$, where $$\in_{plasma} = (\in - (f_{plasma}/f_{incoming\ radiation})^2). \tag{1}$$

$f_{incoming\ radiation}$ is the frequency of the incoming radiation 103; $f_{plasma}$ is the frequency of the plasma; and $\in$ is the original dielectric constant of the substrate 101 at $f_{incoming\ radiation}$. $f_{plasma}^2$ is proportional to the intensity of the incoming radiation 103, and $$f_{plasma}^2 = 1/(2\pi) \times (n \times q^2/(m \times \in_0))^{0.5} \tag{2}$$

where n is the carrier concentration, m is the carrier mass, and q is the charge of the carrier.

The intensity of incoming radiation 103 can be reduced by device 100 by a factor up to 10,000 (100× local field enhancement). In other words, the amount of radiation 103 that is not reflected and passes through the radiation-protection device 100 when the device 100 is in a reflection mode is up to 10,000 times less than the amount of radiation 103 that is incident upon the device 100.

In at least some embodiments of the present invention, the reflected radiation 105 (and, hence, at least part of the incoming radiation 103) is visible or infra-red radiation. In this regard, shorter wavelengths of radiation need more electrons 113 to be reflected. Consequently, the substrate 101 needs to be made of a material that can supply enough electrons to reflect the incoming radiation 103. Accordingly, if the radiation-protection device 100 needs to be able to reflect a high percentage of the incoming radiation 103, then conventional substrate materials, such as Si, Ge, CdSe, etc., tend to be able to provide a sufficient number of electrons 113 to reflect visible and infrared radiation. However, not all applications of the radiation-protection device 100 need to operate in this manner. For example, GaN can be used for the substrate 101, which would reflect a very small percentage of UV radiation, if so desired.

When incoming radiation 103 is low intensity, the substrate 101 is transparent, and the surface structure 102, including metallic pillars 104, acts as a band-stop filter (not shown in FIG. 2). Such a band-stop filter passes all frequencies of incoming radiation 103 and attenuates a frequency of incoming radiation 103 that couples to a frequency in a periodic pattern 115 of the surface structure 102 (see FIG. 1(b)). In this regard, the metallic pillars 104 are formed in a periodic arrangement that causes the radiation-protection device 100 to act as a narrow band-stop filter when radiation is incident upon the radiation protection device 100 having an energy lower than a threshold energy.

One of ordinary skill in the art will appreciate that the surface structure 102 can include a periodic pattern 115 that is repeated along the surface of the substrate 101 with different spacings among the pillars within the periodic pattern 115 to produce differing spatial frequencies. In other words, the scaling of the pattern of pillars 115 can change along the surface of the substrate 101 to produce differing spatial frequencies. In this case, the surface structure 102 would attenuate a range of stop-frequencies matching the frequencies of the periodic pattern 115 represented in the surface structure 102.

On the other hand, the surface structure 102 can be configured as a band-pass filter at low intensities of incoming radiation 103, instead of a band-stop filter. In particular, the dark circles 104(a), 104(b) in FIG. 1(b) can instead be an arrangement of holes in a metallic surface (collectively, surface structure 102), instead of metallic pillars. In this case, the surface structure 102 would attenuate all frequencies of incoming radiation 103 and pass a frequency of incoming radiation 103 that couples to a frequency in a periodic pattern of holes in the surface structure 102. Stated differently, the holes can be formed in a periodic arrangement to cause the radiation-protection device 100 to act as a narrow band-pass filter when radiation is incident upon the radiation-protection device 100 and has an energy lower than the threshold energy.

As discussed above, one of ordinary skill in the art will appreciate that the surface structure 102 can include a periodic pattern of holes that is repeated along the surface of the substrate 101 with different spacings among the holes within the periodic pattern of holes to produce differing spatial frequencies. In other words, the scaling of the pattern of holes can change along the surface of the substrate 101 to produce differing spatial frequencies. In this case, the surface structure 102 would pass a range of pass-frequencies matching the frequencies of the periodic pattern of holes represented in the surface structure 102.

Some embodiments of the present invention have the pillars/holes in at least a partially aperiodic arrangement. An aperiodic arrangement of pillars/holes causes the radiation-protection device 100 to act more as a broadband filter at incident-radiation-energies below a threshold energy.

In addition to being periodic or aperiodic, the pillars/holes can be formed such that they interact with both polarizations of incoming radiation 103. One such arrangement, for example, is the use of pillars/holes 104 formed at right angles to each other (see FIG. 1(b)) to ensure that both polarizations of radiation that are intended to be stopped/passed at low (below-threshold) intensity and reflected at high (above-threshold) intensity of the incoming radiation 103 are, in fact, stopped/passed. If the surface structure arrangement 102 is not designed such that it interacts with both polarizations, unintended radiation may be transmitted through the device 100 at low and high intensities of the incoming radiation 103, depending upon the incoming radiation's polarization.

FIGS. 3(a) and 3(b) illustrate optical systems 200, 202, respectively, that include the radiation-protection device 100, according to some embodiments of the present invention. As shown in FIG. 3(a), the optical system 200 includes optical elements 109(a), 109(b), which, in this embodiment, are lenses. Lens 109(a) represents an upstream lens in a direction from which radiation is incoming, and lens 109(b) represents a downstream lens in a direction in which radiation can be outgoing. The radiation protection device 100 is located in a position that receives incoming radiation before the incoming radiation is received by the downstream lens 109(b). Although not required, the radiation-protection device 100 can be placed in an area of maximum radiation intensity, in this case, the focal point of the lenses 109(a), 109(b), in order to increase an effectiveness of the radiation-protection device 100 in protecting a downstream object(s) (e.g., equipment, persons) that can be damaged by high-intensity radiation. Consequently, at low intensities, at least some of the incoming radiation is passed through the radiation-protection device 100 to the downstream lens 109(b). However, at high intensities, the incoming radiation is largely reflected so that no (or at least a safe amount of) radiation passes to the downstream lens 109(b).

With respect to FIG. 3(b), the optical system 202 includes the radiation protection device 100 downstream of an optical element 109(a), but upstream of an optical element 111. In this embodiment, the optical element 109(a) is a lens, and the optical element 111 is an optical detecting device, such as a CCD or other optical detecting device, known in the art. The radiation protection device 100 is located in a position that receives incoming radiation before the incoming radiation is received by the optical detecting device 111. As with FIG. 3(a), the radiation protection device 100 of FIG. 3(b) can be configured to pass certain frequencies of low-intensity radiation, and to substantially reflect high-intensity radiation to protect the optical detecting device 111. By "substantially reflect", it is meant that high-intensity incoming radiation is almost completely reflected by the radiation-protection device 100 or at least enough of the high-intensity incoming radiation is reflected so that a safe amount of radiation passes through the radiation-protection device 100.

The energy of incoming radiation 103 at which the radiation-protection device 100 changes from a reflecting (i.e., high-energy) mode to a transmitting (i.e., low-energy) mode is referred to herein as a threshold energy T. In this regard, it can be said that the surface structure 102 has an arrangement and interacts with radiation and the substrate 101 to at least (a) substantially transmit or attenuate radiation at a wavelength $L_f$ and an energy below the threshold energy T, and (b) substantially reflect radiation at the wavelength $L_f$ and an energy above the threshold energy T.

The threshold energy T can be selected to suit a chosen application for the radiation-protection device 100. Once the threshold energy T is chosen, the radiation-protection device 100 can be designed to change from a low-energy mode to a high-energy, reflecting mode at the selected threshold energy T. In particular, the threshold energy T is dependent upon an ionization energy $EI_s$, known in the art, of the substrate 101, the wavelength $L_f$ of radiation to be transmitted or attenuated in the transmitting mode, and a local field enhancement LFE, known in the art, caused by the arrangement of the surface structure 102.

Table 1, below, shows a few possibilities of materials for substrate 101 and their corresponding typical threshold energies T in $MW/cm^2$ for a wavelength $L_f$, with an electron density n of $\sim 10^{18}$-$10^{20}$ $cm^{-3}$ and an LFE of 1 (i.e., no enhancement).

TABLE 1

| Wavelength [um] | ZnSe | CdS | Ge | GaAs |
| --- | --- | --- | --- | --- |
| 10 | 43 | 27 | 12 | 4 |
| 0.8 | 1902 | 1198 | 532 | 170 |

If it is desirable to keep the substrate 101 transparent in the low-energy mode, it can be preferable to use a semiconductor material as the substrate 101 with a bandgap that is several times higher than the optical energy of a photon at the wavelength $L_f$. Otherwise, the substrate will become more radiation-absorbent. Such a bandgap also requires multiple photons to reach the threshold energy T where ionization occurs, which can be preferable when higher threshold energies are desired.

When the threshold energy T, the material for the substrate, and the wavelength of radiation $L_f$ to be transmitted or attenuated are known, the arrangement of the surface structure 102 can be chosen to cause a local field enhancement LFE that provides the known (or predetermined) threshold energy T according to the following equation #3:

$$T = EI_s(L_f)/LFE^2 \qquad (3)$$

In this regard, the local field enhancement LFE is tailored by arranging the pattern of metallic pillars/holes appropriately on the substrate 101. LFE is inversely proportional to the size of particular features (pillars or holes). For example, FIG.

1(b) shows pillars/holes 104(a) that have a relatively large cross-sectional area, and metallic pillars/holes that have a relatively small cross-sectional area. The cross-sectional area of the smaller pillars/holes 104(b) define the LFE for equation (3), discussed above. The larger pillars/holes 104(a) collect radiation and are capacitively coupled to the smaller pillars/holes 104(b). The pillar shapes and sizes define the bandwidth of the pass/stop band of the filter at low incident-radiation energies.

Figure 4A:
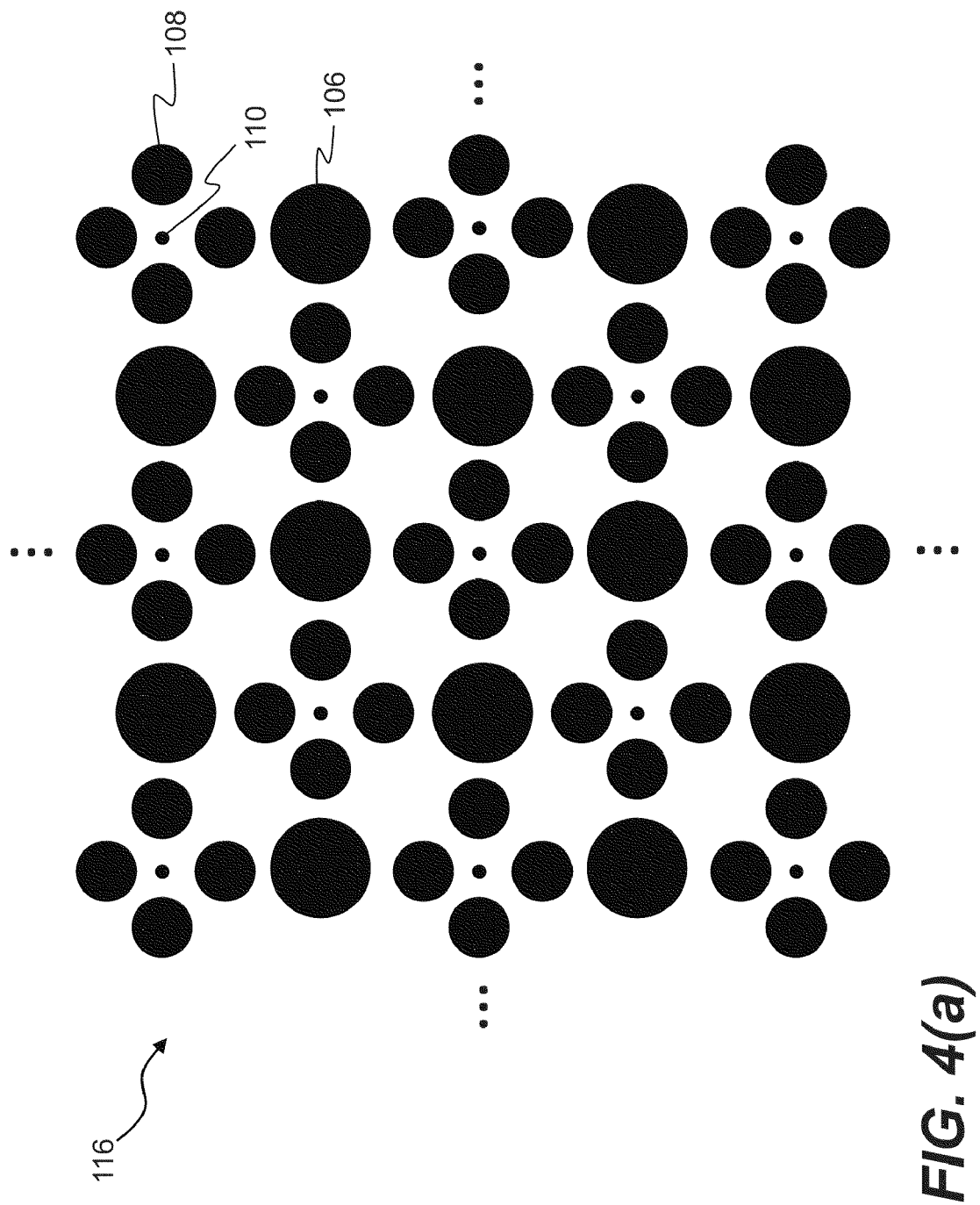
FIGS. 4(a)-4(d) illustrate various surface structures and arrangements thereof for a radiation-protection device, according to some embodiments of the present invention.

It should be noted that the invention is not limited to any particular surface structure arrangement. For example, FIGS. 4(a)-4(d) illustrate various surface arrangements of the surface structure 102 for the radiation-protection device 100, according to some embodiments of the present invention. FIG. 4(a) illustrates that a surface structure arrangement 116 of pillars/holes can have more than two cross-sectional areas. For instance, pillars/holes 106 have larger cross-sectional areas than pillars/holes 108. Pillars/holes 108 have larger cross-sectional areas than pillars/holes 110. In this embodiment, the pillars/holes 110 define the LFE in equation (3), above. Because the surface structure arrangement 116 is periodic and exhibits right-angle relationships among the pillars/holes 106, 108, 110, a device 100 exhibiting this surface structure arrangement 116 would act as a band stop/pass filter (if pillars or holes are used, respectively) for incoming radiation energies below the threshold energy T for both polarizations of incoming radiation. Such a device 100 would substantially reflect incoming radiation 103 having an energy above the threshold energy T. Although the surface structure arrangement 116 includes three different cross-sectional areas, more than three can be used. Having more cross-sectional areas would allow a more controlled way of forming the LFE and would make the LFE less sensitive to feature size. However, designs that include more metallic area in the surface structure 102 exhibit reduced LFE as compared to designs that include less metallic area in the surface structure 102, because the increased metallic area dissipates the LFE. Accordingly, if a design having more cross-sectional areas includes more metallic area than a design having fewer cross-sectional areas, the design with more cross-sectional areas will have less LFE than the design with fewer cross-sectional areas.

Figure 4B:
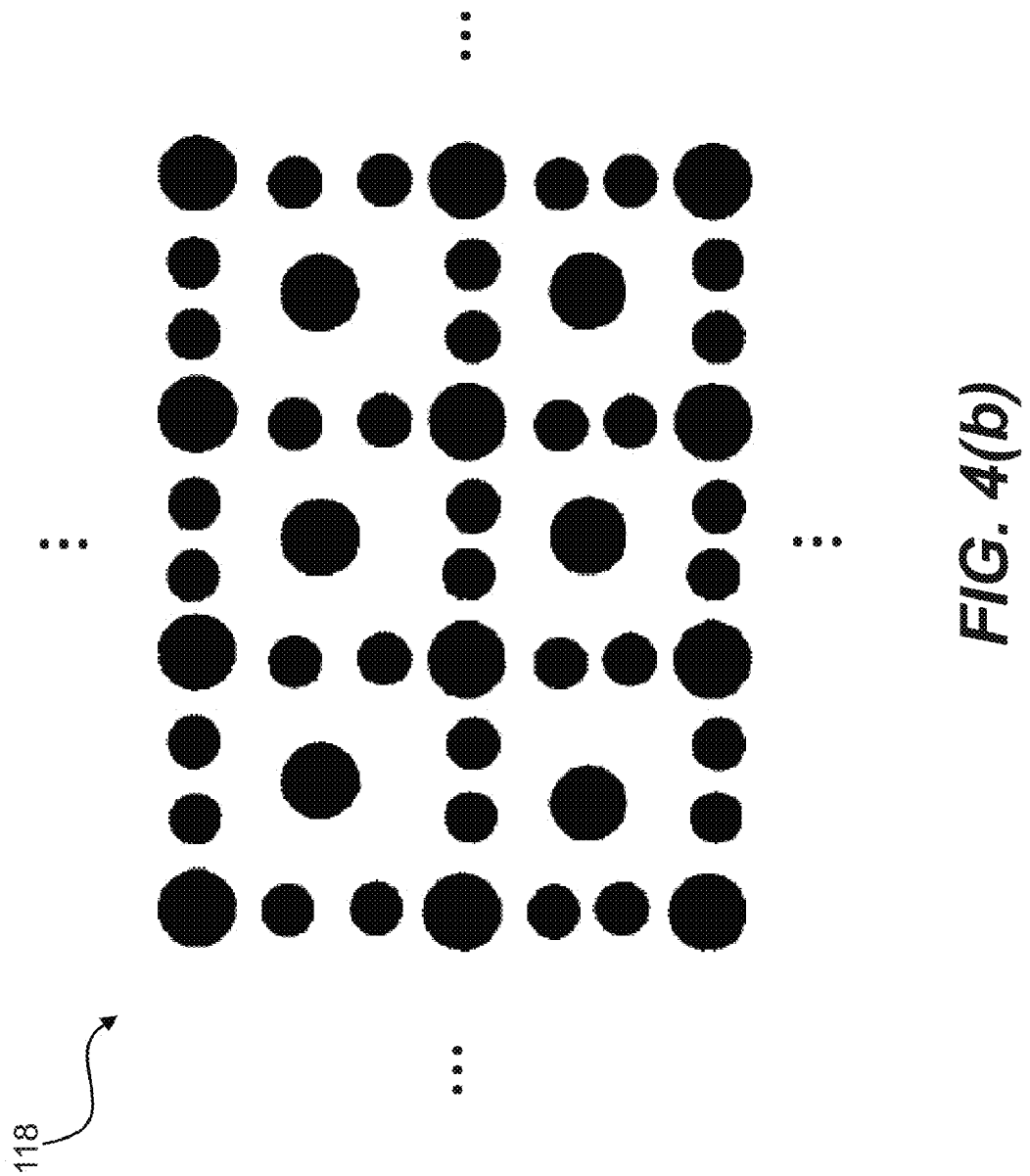

FIG. 4(b) illustrates that different-shaped, repeating patterns in a surface structure arrangement can be used. In particular, FIG. 4(b) illustrates a rectangular surface structure arrangement 118, as contrasted to the diamond-shaped arrangements of FIGS. 1(b) and 4(a). As with FIG. 4(a), a device 100 having the surface structure 118 of FIG. 4(b) would act as a band stop/pass filter (if pillars or holes are used, respectively) for incoming radiation energies below the threshold energy T for both polarizations of incoming radiation. Such a device 100 would substantially reflect incoming radiation 103 having an energy above the threshold energy T.

Figure 4C:
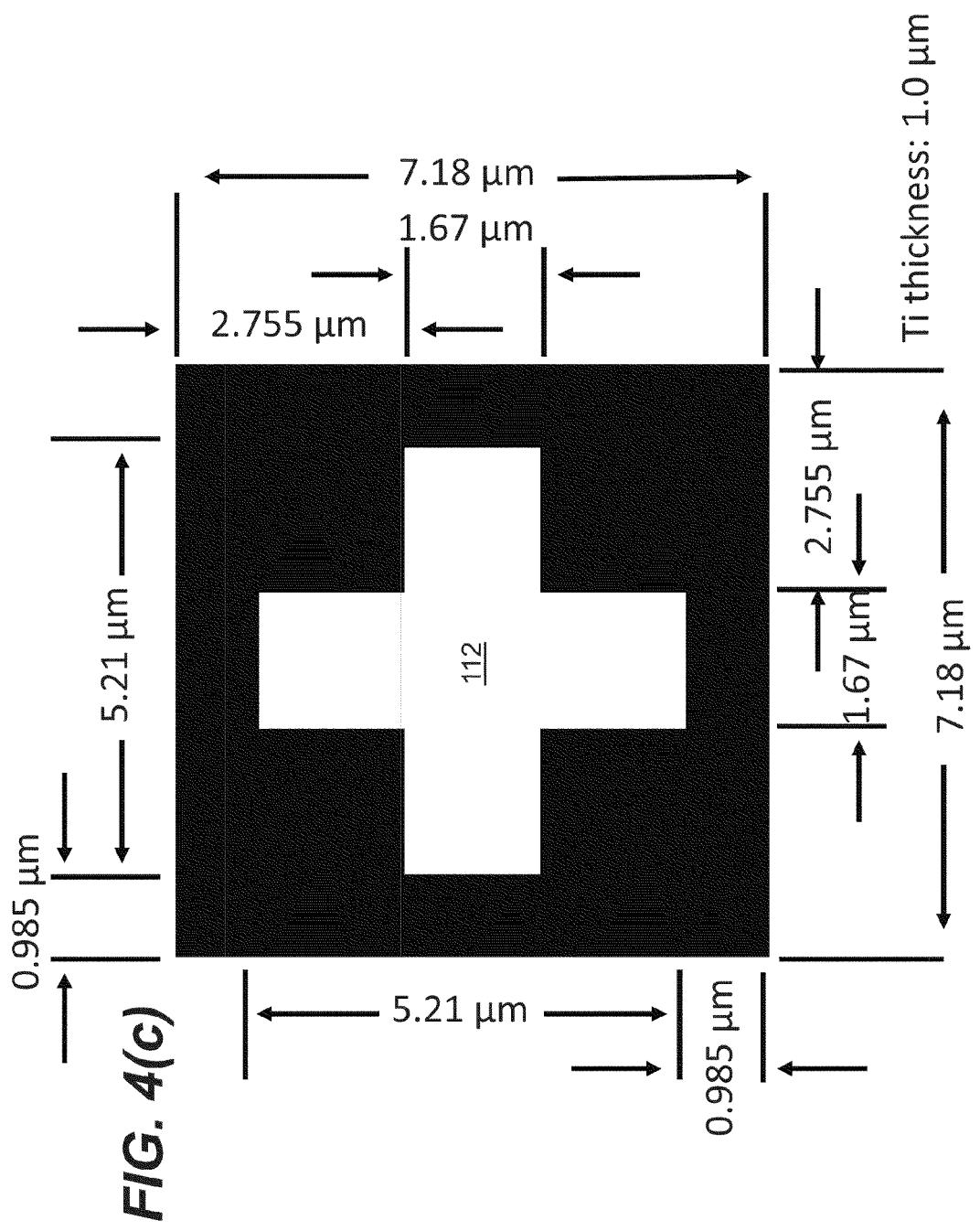
Figure 4D:
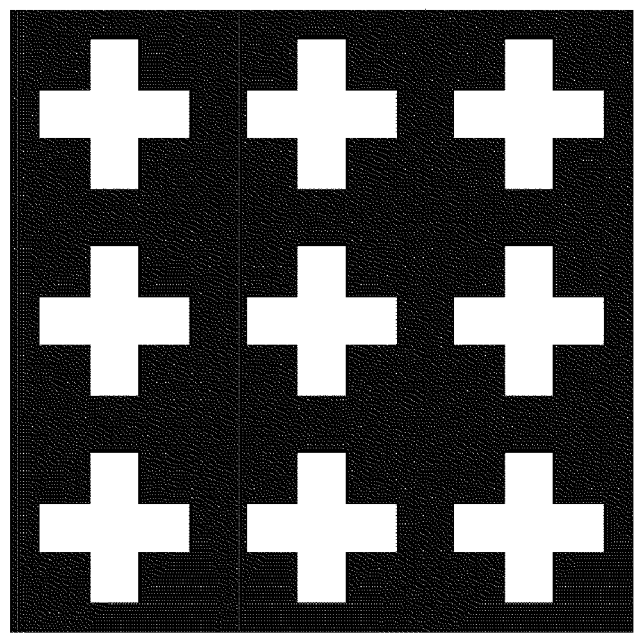

FIGS. 4(c) and 4(d) illustrate that the pillars/holes in a surface structure need not be round in shape. In the case of FIG. 4(c), the hole/pillar 112 has a cross shape and is repeated at right-angles to form the surface structure 114 in FIG. 4(d). In this case, local electric fields tend to concentrate in the corners of the cross shapes. The measurements shown in FIG. 4(c) were chosen due to manufacturing tradeoffs for a specific embodiment. For example, FIG. 4(c) shows a titanium pillar thickness or height of 1.0 μm. Such measurements, however, can be changed depending on design considerations and equipment available in a fabrication lab. The indicated titanium thickness in FIG. 4(c) As with FIGS. 4(a) and 4(b), a device 100 having the surface structure 114 of FIG. 4(d) would act as a band stop/pass filter (if pillars or holes are used, respectively) for incoming radiation energies below the threshold energy T for both polarizations of incoming radiation. Such a device 100 would substantially reflect incoming radiation 103 having an energy above the threshold energy T.

Figure 5:
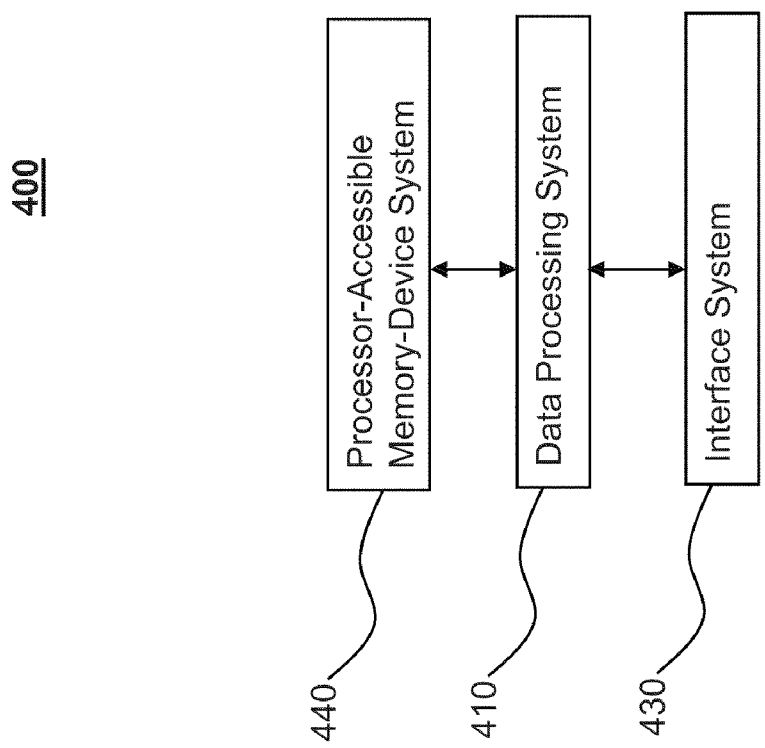
FIG. 5 illustrates a system for determining an arrangement of a surface structure for a radiation-protection device, according to an embodiment of the present invention.

FIG. 5 illustrates a system 400 for determining an arrangement of a surface structure 102 for a radiation-protection device 100, according to an embodiment of the present invention. The system 400 includes a data processing system 410, an interface system 430, and a processor-accessible memory-device system (also referred to as a "data storage system") 440. The data storage system 440 and the interface system 430 are communicatively connected to the data processing system 410.

Figure 6:
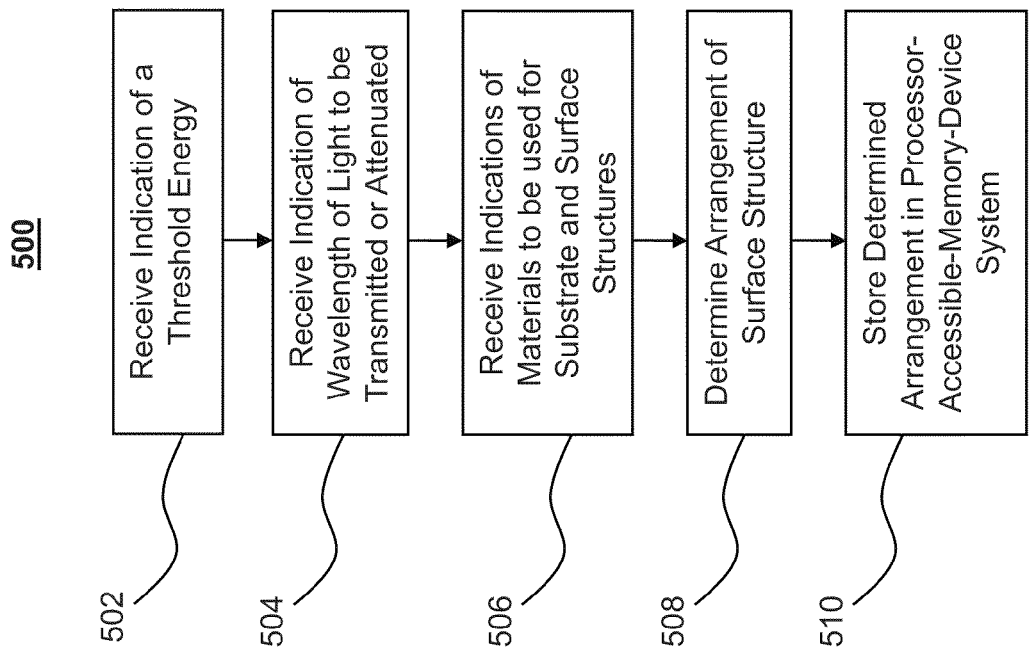
FIG. 6 illustrates a method for determining an arrangement of a surface structure for a radiation-protection device, according to an embodiment of the present invention.

The data processing system 410 includes one or more data processing devices that implement processes of the various embodiments of the present invention, including the example processes of FIG. 6 described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The data storage system 440 includes one or more processor-accessible memory devices configured to store information, including the information needed to execute processes of the various embodiments of the present invention, including the example processes of FIG. 6 described herein. The data storage system 440 can be a distributed data storage system including multiple processor-accessible memory-devices communicatively connected to the data processing system 410 via a plurality of computers and/or devices. On the other hand, the data storage system 440 need not be a distributed data storage system and, consequently, can include one or more processor-accessible memory-devices located within a single data processor or device.

The phrase "processor-accessible memory-device" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data can be communicated. Further, the phrase "communicatively connected" is intended to include a connection between devices or programs within a single data processor, a connection between devices or programs located in different data processors, and a connection between devices not located in data processors at all. In this regard, although the data storage system 440 is shown separately from the data processing system 410, one skilled in the art will appreciate that the data storage system 440 can be stored completely or partially within the data processing system 410. Further in this regard, although the interface system 430 is shown separately from the data processing system 410, one skilled in the art will appreciate that such system 430 can be located completely or partially within the data processing system 410.

The interface system 430 can include a mouse, a keyboard, another computer, or any device or combination of devices from which data is input to the data processing system 410. The interface system 430 also can include a display device, a processor-accessible memory-device, or any device or combination of devices to which data is output by the data processing system 410. In this regard, if the interface system 430 includes a processor-accessible memory-device, such memory-device can be part of the data storage system 440 even though the interface system 430 and the data storage system 440 are shown separately in FIG. 5.

FIG. 6 illustrates a method 500 for determining an arrangement of a surface structure 102 for a radiation-protection device 100, according to an embodiment of the present invention. At step 502, the data processing system 410 receives, via the interface system 430 or from the data storage system 440, an indication of the threshold energy T at or about at which the device 100 is to change from transmitting or attenuating radiation to reflecting radiation. At step 504, the data processing system 410 receives an indication, via the interface system 430 or from the data storage system 440, of a wavelength of radiation $L_f$ to be transmitted or attenuated when interacting with the device 100 at an energy below the threshold energy T. And, at step 506, the data processing system 410 receives an indication, via the interface system 430 or from the data storage system 440, of a material to be used for the substrate 101 for the device 100 and an indication of a material to be used for the surface structure 102 for the device 100 to be formed on the substrate 101.

Then, the data processing system 410 at step 508 determines an arrangement of the surface structure 102 that will transmit or attenuate the wavelength of radiation $L_f$ when interacting with the device 100 at an energy below the threshold energy T, and will reflect the wavelength of radiation $L_f$ at an energy above the threshold energy T. Such determination can occur pursuant to equation (3), above, where the arrangement of the surface structure 102 is determined to cause an appropriate local field enhancement LFE that will provide the desired threshold energy T. The data processing system 410 stores the determined arrangement of the surface structure 102 in the data storage system 440.

It is to be understood that the exemplary embodiments are merely illustrative of the present invention and that many variations of the above-described embodiments can be devised by one skilled in the art without departing from the scope of the invention.

For example, although the pillars 104 often are described herein as being metallic, they can also be formed of a dielectric that has metallic properties when interacting with a particular radiation wavelength or wavelengths of interest at sufficient energy. For example, pillars 104 formed of SiC would have metallic properties when interacting with a radiation wavelength of 10 um at sufficient energy.

It is therefore intended that all such variations be included within the scope of the following claims and their equivalents.

| | PARTS LIST |
|---|---|
| 100 | Radiation-Protection Device |
| 101 | Substrate |
| 102 | Metallic Surface Structure |
| 103 | Incoming Radiation |
| 104 | Pillar |
| 104(a) | Pillar/Hole having Relatively Large Cross-Sectional Area |
| 104(b) | Pillar/Hole having Relatively Small Cross-Sectional Area |
| 105 | Reflected Radiation |
| 106 | Pillar/Hole having Larger Cross-Sectional Area than Pillar/Hole 108 |
| 107 | Channel of Free Electrons |
| 108 | Pillar/Hole having Smaller Cross-Sectional Area than Pillar/Hole 106 |
| 109(a) | Upstream Optical Element that is a Lens |
| 109(b) | Downstream Optical Element that is a Lens |

| | -continued |
|---|---|
| | PARTS LIST |
| 110 | Pillar/Hole having Smaller Cross-Sectional Area than Pillar/Hole 108 |
| 111 | Optical Element that is an Optical Detecting Device |
| 112 | Pillar/Hole having a Cross Shape |
| 113 | Electron |
| 114 | Surface Structure Arrangement of Pillars/Holes 112 |
| 115 | Periodic Pattern in the Surface Structure |
| 116 | Surface Structure Arrangement of Pillars/Holes Having Three Different Cross-Sectional Areas |
| 118 | Rectangular Surface Structure Arrangement of Pillars/Holes |
| 200 | Optical System |
| 202 | Optical System |
| 400 | System |
| 410 | Data Processing System |
| 430 | Interface System |
| 440 | Processor-Accessible Memory-Device System |
| 500 | Method |
| 502 | Step |
| 504 | Step |
| 506 | Step |
| 508 | Step |
| 510 | Step |
| 602 | 24 um Periodicity in Surface Structure Arrangement |
| 604 | 12 um Periodicity in Surface Structure Arrangement |
| 606 | 6 um Periodicity in Surface Structure Arrangement |

What is claimed is:

1. A radiation-protection device, comprising:
   a substrate; and
   a surface structure formed on the substrate, the surface structure having an arrangement and interacting with radiation and the substrate to at least (a) substantially transmit or attenuate radiation at a wavelength and an energy below a threshold energy, and (b) substantially reflect radiation at the wavelength and an energy above the threshold energy;
   wherein the surface structure is formed of a metal and the substrate is formed of a semiconductor.

2. A radiation-protection, comprising:
   a substrate; and
   a surface structure formed on the substrate, the surface structure having an arrangement and interacting with radiation and the substrate to at least (a) substantially transmit or attenuate radiation at a wavelength and an energy below a threshold energy, and (b) substantially reflect radiation at the wavelength and an energy above the threshold energy;
   wherein a band gap of the substrate is several times higher than an optical energy of a photon at the wavelength.

3. A radiation-protection device, comprising:
   a substrate; and
   a surface structure formed on the substrate, the surface structure having an arrangement and interacting with radiation and the substrate to at least (a) substantially transmit or attenuate radiation at a wavelength and an energy below a threshold energy, and (b) substantially reflect radiation at the wavelength and an energy above the threshold energy;
   wherein the surface structure is a surface plasmon structure.

4. The radiation-protection device of claim 3, wherein the radiation is visible light or infra-red radiation.

5. A optical system, comprising:
   an optical element; and
   a radiation-protection device located in a position that receives incoming radiation before the incoming radiation is received by the optical element, the radiation-protection device comprising a substrate and a surface structure formed on the substrate, the surface structure having an arrangement and interacting with radiation and the substrate to at least (a) substantially transmit or attenuate radiation at a wavelength and an energy below a threshold energy, and (b) substantially reflect radiation at the wavelength and an energy above the threshold energy;

wherein the radiation-protection device is located at or substantially at a focal point of the optical element.

6. The optical system of claim 5, wherein the optical element is a lens.

7. The optical system of claim 5, wherein the optical element is an optical detecting device.

8. A radiation-protection device of claim 1, comprising:
a substrate; and
a surface structure formed on the substrate, the surface structure having an arrangement and interacting with radiation and the substrate to at least (a) substantially transmit or attenuate radiation at a wavelength and an energy below a threshold energy, and (b) substantially reflect radiation at the wavelength and an energy above the threshold energy;

wherein the surface structure comprises a metallic surface with holes therein.

9. The radiation-protection device of claim 8, wherein some of the holes are larger than others of the holes.

10. The radiation-protection device of claim 8, wherein the holes are formed in a periodic arrangement, and wherein the radiation-protection device acts as a band-stop filter when radiation is incident upon the radiation-protection device having energy lower than the threshold energy.

11. The radiation-protection device of claim 8, wherein the holes are formed in an aperiodic arrangement, and wherein the radiation-protection device acts as a broader-band-stop filter than if the holes were formed in a periodic arrangement when radiation is incident upon the radiation-protection device having energy lower than the threshold energy.

12. A radiation-protection, comprising:
a substrate; and
a surface structure formed on the substrate, the surface structure having an arrangement and interacting with radiation and the substrate to at least (a) substantially transmit or attenuate radiation at a wavelength and an energy below a threshold energy, and (b) substantially reflect radiation at the wavelength and an energy above the threshold energy;

wherein the surface structure comprises metallic pillars.

13. The radiation-protection device of claim 12, wherein the metallic pillars are formed in a periodic arrangement, and wherein the radiation-protection device acts as a band-stop filter when radiation is incident upon the radiation-protection device having energy lower than the threshold energy.

14. The radiation-protection device of claim 12, wherein the metallic pillars are formed in an aperiodic arrangement, and wherein the radiation-protection device acts as a broader-band-stop filter than if the metallic pillars were formed in a periodic arrangement when radiation is incident upon the radiation-protection device having energy lower than the threshold energy.

15. The radiation-protection device of claim 12, wherein the pillars are formed at or substantially at right-angles to each other.

16. The radiation-protection device of claim 12, wherein some of the metallic pillars comprise larger cross-sectional areas than others of the metallic pillars.

17. The radiation-protection device of claim 16, wherein the pillars having a larger cross-sectional area are capacitively coupled to at least some of the pillars having a relatively small cross-sectional area.

* * * * *